(12) United States Patent
Twerdochlib

(10) Patent No.: US 7,861,592 B2
(45) Date of Patent: Jan. 4, 2011

(54) BLADE SHROUD VIBRATION MONITOR

(75) Inventor: Michael Twerdochlib, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 982 days.

(21) Appl. No.: 11/711,843

(22) Filed: Feb. 27, 2007

(65) Prior Publication Data

US 2008/0206057 A1    Aug. 28, 2008

(51) Int. Cl.
*G01N 29/07* (2006.01)

(52) U.S. Cl. .............................. 73/660; 73/593; 73/649

(58) Field of Classification Search ............... 73/660, 73/593, 649, 654, 661; 702/34, 183; 324/207.22
See application file for complete search history.

(56) References Cited

U.S. PATENT DOCUMENTS

| | | | |
|---|---|---|---|
| 3,908,444 A * | 9/1975 | Peter ........................... 73/655 |
| 4,524,620 A * | 6/1985 | Wright et al. ................. 73/587 |
| 4,790,189 A | 12/1988 | Twerdochlib |
| 4,887,468 A | 12/1989 | McKendree et al. |
| 4,896,537 A | 1/1990 | Osborne |
| 5,097,711 A | 3/1992 | Rozelle et al. |
| 5,148,711 A | 9/1992 | Twerdochlib et al. |
| 5,206,816 A * | 4/1993 | Hill et al. ...................... 702/56 |
| 5,498,136 A | 3/1996 | Namura et al. |
| 5,540,551 A | 7/1996 | Heinig |
| 6,094,989 A | 8/2000 | Twerdochlib |
| 6,404,188 B1 * | 6/2002 | Ricks ..................... 324/207.22 |
| 6,584,849 B2 * | 7/2003 | Loftus et al. .................. 73/659 |
| 6,668,651 B2 * | 12/2003 | Beausseroy et al. ........... 73/579 |
| 6,708,565 B2 * | 3/2004 | Lin et al. ...................... 73/660 |
| 7,006,947 B2 * | 2/2006 | Tryon et al. .................. 702/183 |
| 7,082,371 B2 | 7/2006 | Griffin et al. |
| 7,473,077 B2 * | 1/2009 | Gaffiero et al. ............... 416/61 |
| 7,509,862 B2 * | 3/2009 | Cohen et al. .................. 73/660 |
| 2006/0000283 A1 | 1/2006 | Twerdochlib |
| 2009/0326834 A1 * | 12/2009 | Sundaresan et al. ........... 702/34 |

* cited by examiner

*Primary Examiner*—J M Saint Surin

(57) ABSTRACT

A method for predicting a blade structure failure within a coupled blade structure including a plurality of blades supported for rotation on a rotor and a shroud structure coupling the blades. The method includes the steps of determining displacements of a plurality of predetermined circumferential locations on the shroud structure during rotation of the blade row, where the displacements are provided as a function of time relative to the periodic rotation of the shroud structure for time intervals that are integer multiples of rotor rotation. A signal characteristic related to vibrational mode and a nodal diameter of the shroud structure is derived based on the displacements of the circumferential locations on the shroud structure.

15 Claims, 4 Drawing Sheets

BLADE SHROUD VIBRATION MONITOR

FIELD OF THE INVENTION

The present invention relates to monitoring the vibrational characteristics of a rotating blade row and, more particularly, to a method of analyzing the vibrational characteristics of a consolidated unitary blade structure comprising a rotating row of blades and a circumferential shroud coupling the blades.

BACKGROUND OF THE INVENTION

A high speed turbo machine, such as, for example, a steam or gas turbine, generally comprises a plurality of blades arranged in axially oriented rows, the rows of blades being rotated in response to the force of a high pressure fluid flowing axially through the machine. Due to their complex design, natural resonant mechanical frequencies of the blades may coincide with or be excited by certain blade rotational speeds and rotational harmonics thereof. Each natural frequency is associated with a particular mode, each of which is a different combination of vibrational deflections such as along the rotational axis of the turbine, perpendicular to the rotational axis of the turbine, and so forth. To prevent excessive vibration of the blade about its normal position, prudent design practice dictates that the blades be constructed such that the frequencies of the lowest modes fall between harmonics of the operating frequency of the turbine. However, the blades may be excited by non-synchronous forces such as aerodynamic buffeting or flutter. This may occur even if the natural resonance frequencies of the blade are not near the harmonics of the running speed of the turbine. When the amplitude of the vibration exceeds a certain level, objectionable stresses are set up in the blade. If the condition is not detected and remedied, the blade may eventually fracture resulting in extensive damage, thus shutting the machine down and requiring a costly forced outage for extensive repair. In order to avoid the aforementioned problem, detailed testing is performed prior to operation of a machine to ensure that blades will not resonate during normal operation.

It is also desirable to monitor rotating blades during operation in order to identify vibration problems which develop after a turbo machine is put in use. This on-line evaluation is necessary in part because evaluations performed prior to actual use do not subject the blades to the same temperature, pressure, fluid flow and rotational conditions associated with adjacent vanes and blades, and other conditions which are experienced during normal operations. Continuous monitoring of blade vibrations is also important in order to detect new vibrations which signal structural changes. If any of these vibrations escape detection, developing fractures will likely lead to extensive damage and costly down time while the machine undergoes repair. For example, it is known to use non-contacting proximity sensors or probes to detect blade vibrations. The probes detect the actual time-of-arrival of each blade as it passes each probe. The difference between the actual time-of-arrival of each blade and its expected time-of-arrival, determined with the use of an additional probe which tracks rotation of the turbine wheel, produces a signal containing blade vibration information. Fourier analysis is applied to this signal to extract the blade vibration frequencies and amplitudes.

In order to limit vibrational stresses in the blades, various structures may be provided to the blades to form a cooperating structure between blades that serves to dampen the vibrations, and to otherwise make the blade structure non-responsive to flow excitation generated during rotation of the rotor that might excite the blade. For example, in a known steam turbine blade construction, each turbine blade may be provided with an outer shroud portion located at an outer edge of the blade and having front and rear shroud contact surfaces. The front and rear shroud contact surfaces of adjacent blades are normally separated by a small gap when the rotor is stationary, and move into contact with each other as the rotor begins to rotate to form a substantially continuous circumferential shroud structure. The circumferential shroud structure substantially raises the natural frequencies of all modes of vibration and thus reduces the number of vibrational modes that can interact with the lower harmonics of the rotor rotational speed as well as for those due to flow induced nonsynchronous blade excitations. Moreover, the circumferential shroud structure tends to respond substantially at a single vibrational frequency for each mode of vibration, i.e., the frequency that is associated with a nodal diameter pattern in the blade row, where the number of nodal diameters is equal to the number of the harmonic of the running speed at which the vibration occurs.

With regard to nonsynchronous vibration that is typically induced by aero elastic (flow) effects, i.e., not a multiple of shaft frequency, shrouding the blades and placing points of contact, such as snubbers, at several points of contact along the length of each blade severely restricts the conditions under which the blades will accept energy from the flow excitation forces, for generating blade vibration. That is, not only must the aero elastic excitation forces have the correct frequency, they must also have the correct restricted set of nodal patterns. For a free-standing blade, only the frequency of the excitation force need match. The shrouded blade row is thus generally unresponsive at most flow excitations, even when the frequency content in the flow energy matches the resonance frequency of the blade. Further, as a result of the increased stiffness in the system caused by the coupled shrouded blades, each nodal pattern shifts the fundamental free standing blade frequencies from what they normally would be without the increase in stiffness.

In known systems for monitoring and analyzing vibrations in shrouded blade structures, where the shroud is made integral with the blade, the shroud may be provided with targets that are placed in the shroud, where one target is generally provided to each shroud portion associated with a blade, such that each target corresponds to a blade. In most field test and on-line applications, a single sensor may be provided for sensing the arrival of each target as the target passes the sensor. The data is analyzed on the basis of data identified with each target, i.e., each blade, such that the vibration characteristics of each target location are individually analyzed, based on multiple rotations of the blade row, to characterize the vibration characteristics of the coupled shroud structure.

SUMMARY OF THE INVENTION

In accordance with one aspect of the invention, a method of monitoring a rotating coupled blade row with a vibration monitor is provided, the rotating coupled blade row comprising a plurality of blades supported for rotation on a rotor and a shroud structure coupling the blades and defining an outer circumference of the blade row. The vibration monitor comprises a stationary sensor positioned at the shroud structure and a plurality of sensor targets positioned at circumferentially spaced locations on the shroud structure with the sensor providing a time-dependent output signal responsive to the passage of each the sensor target. The method comprises the steps of determining, based on sensor output signals provided from the sensor, the actual arrival time of each the sensor target, and the vibration monitor storing a plurality of sensor output signals as a function of time relative to the periodic rotation of the shroud structure, calculating for each of the sensor output signals a displacement between the actual arrival time and a predetermined expected arrival time for each sensor target to determine displacements of a plurality of different circumferential locations on the shroud structure as a function of time, and deriving a signal characteristic of a vibrational mode of the shroud structure based on the displacements of the circumferential locations on the shroud structure.

In accordance with another aspect of the invention, a method is provided for predicting a blade structure failure within a blade structure comprising a plurality of blades supported for rotation on a rotor and a shroud structure coupling the blades. The method comprises the steps of determining displacements of a plurality of predetermined circumferential locations on the shroud structure during rotation of the blade row, where the displacements are provided as a function of time relative to the periodic rotation of the shroud structure for time intervals that are integer multiples of rotor rotation, and deriving a signal characteristic of a vibrational mode of the shroud structure based on the displacements of the circumferential locations on the shroud structure.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
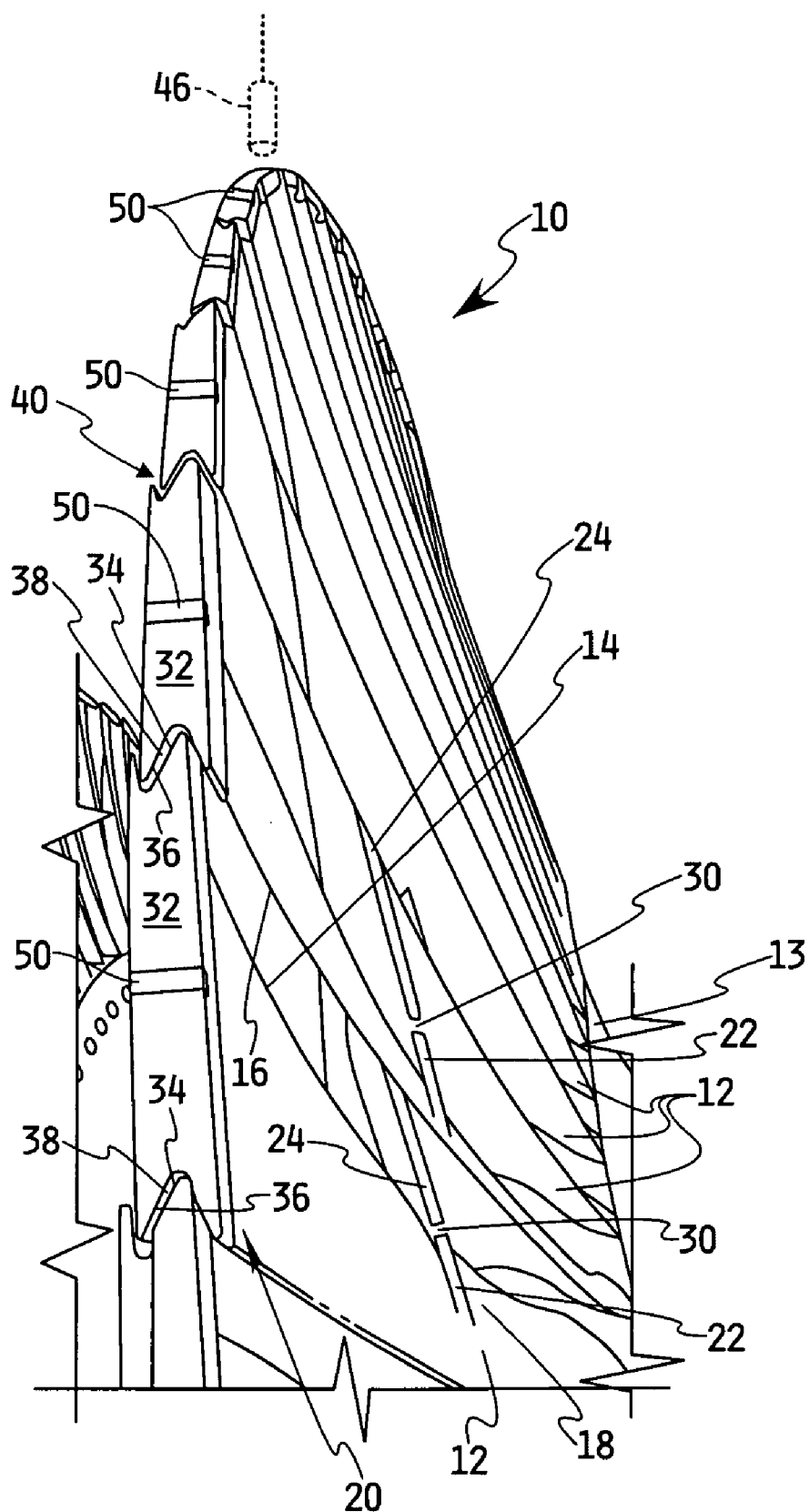
FIG. 1 is a perspective view of a portion of a turbine rotor assembly including shroud portions provided with sensor targets.
Figure 2:
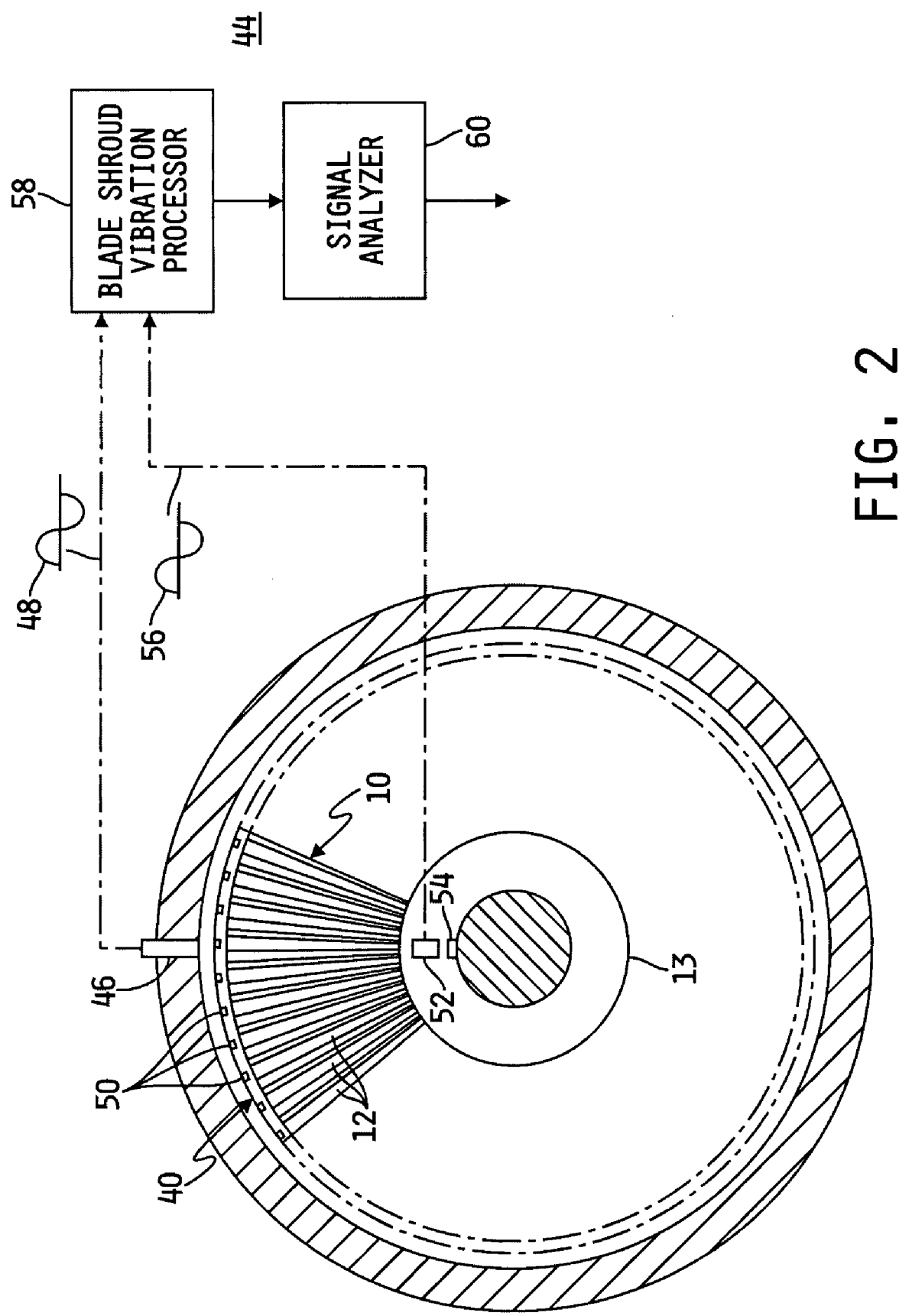
FIG. 2 is diagrammatic view illustrating a blade shroud vibration monitor system for performing the present invention.

FIGS. 1 and 2 illustrate a portion of a shrouded turbine rotor assembly including a row of turbine blades 10 comprising individual blades 12 mounted to a rotor 13, with each blade having a leading edge 14, a trailing edge 16, a center section 18 and an outside edge 20. The center section 18 of each blade 12 may include front and rear mid-span snubber members 22, 24, respectively, where "front" and "rear" are referenced with respect to a turbine rotational direction. The mid-span snubber members 22, 24 are located to form a small gap 30 therebetween when the row of blades 10 is stationary.

The outside edges 20 of each of the blades 12 includes a shroud portion 32, where each shroud portion 32 comprises a front end or contact surface 34 and an opposing rear end or contact surface 36. The front and rear contact surfaces 34, 36 of adjacent shroud portions 32 define an interlocking Z-shroud region 38 comprising a small gap located between the contact surfaces 34, 36. During rotor spin-up, the adjacent mid-span snubber members 22, 24 move into engagement with each other, and the adjacent front and rear contact surfaces 34, 36 of adjacent shroud portions 32 move into engagement with each other to form a very tight lockup of the shroud portions 32 to define a substantially unitary or consolidated circumferential outer shroud 40. It should be understood that although only a few blades 12 are illustrated in FIGS. 1 and 2, the rotor 13 may support several rows of blades 12, each row including a plurality of blades 12 positioned circumferentially about the rotor 13.

During operation of the turbine, the blades 12 and outer shroud 40 tend to vibrate at natural frequencies associated with the consolidated structure 40. Referring to FIG. 2, a blade shroud vibration monitoring (BSVM) system 44 is illustrated. The BSVM system 44 includes a shroud target sensor 46 for producing a signal 48 having a near sinusoidal waveform, if a magnet sensor is used, with every other zero crossing, or other assigned signal level, corresponding to sensing passage of each of a plurality of sensor targets 50. It may be noted that the generated signal may alternatively comprise a short pulse signal if a laser sensor is employed.

In the illustrated embodiment, a target 50 is provided at a generally central location on each of the shroud portions 32, such that a target 50 is associated with each of the blades 12. However it should be noted that the present invention does not require that the number of targets 50 correspond to any particular number of blades 12 or shroud portions 32, and that the number of targets 50 may be fewer than or greater than the number described herein. The sensor 46 may comprise, for example, an Eddy current, reluctance, laser, infrared or microwave sensor. The targets 50 may comprise any triggering element that may be sensed by the aforementioned sensors including, for example, slots cut in the shroud portions 32, plasma deposited strips, or iron or steel targets imbedded in the shroud portions 32, where the shroud portions 32 are typically formed of a titanium alloy.

The signals provided by passage of the targets 50 are indicative of an actual time-of-arrival of each target 50 at the sensor 46. In addition, a reference sensor 52 operates in conjunction with an indicia 54 on the rotor 13 to provide an output signal 56 having one zero crossing per rotor rotation, as is commonly know in the turbine art, to be used in analyzing the signals 48 received from the shroud target sensor 46. The signal 48 from the shroud target sensor 46 and the signal 56 from the reference sensor 52 are input to a blade shroud vibration processor 58. The blade shroud vibration processor 58 processes each of the output signals 48, 56 to determine and store a time-of-arrival for each target 50 passing the sensor 46, and for the rotor indicia 54 passing the reference sensor 52 providing a shaft phasor output. The time-of-arrival data stored in the processor 58 is provided as an input to a signal analyzer 60. It may be noted that only a single clock reading, or time-of-arrival, is saved for each target 50 each time a target 50 passes by the sensor 46. The time-of-arrival is stored as a 32 bit word, where 8 bits are reserved for a tag number assigned to each sensor, including the reference sensor 52, and 24 bits are reserved for the clock reading. The storage of the exact time that each target 50 reaches the sensor 46 may be performed at a very high resolution using a clock typically comprising a 96 MHz oscillator, such that each second is divided into 1/96,000,000 parts. The BSVM system 44 may monitor several rows of blades. Accordingly, for a 58 blade row, i.e., 58 targets, the BSVM system 44 will acquire only 58 time-of-arrival data points for each revolution of the rotor 13, plus one phasor time-of-arrival data point (once per revolution) for the reference sensor 52. It should be noted that the sensing and data collection elements of the present invention, including the signals 48, 56 and the vibration processor 58 and signal analyzer 60, may be configured for sensing displacements between actual target arrival times and predetermined anticipated or expected arrival times in accordance with principles applied in known blade vibration monitor (BVM) systems for determining deflection or displacement of individual blades, such as is known from the BVM system described in U.S. Pat. No. 4,887,468 and incorporated herein by reference, with the exception that sufficient data for the present invention may be obtained through use of the single shroud target sensor 46, rather than the two sensors disclosed for the apparatus of the '468 patent. However, the present invention is not limited to any particular number of shroud target sensors 46, and plural shroud target sensors 46 of any number or other modifications may be incorporated for the purposes of the present invention.

In the prior art BVM systems, a data stream comprising a time-of-arrival for all of the blades was collected for a predetermined number of rotations of a rotor, e.g., typically 32 rotations, and the data was sorted to construct the time-of-arrival for each individual blade. The measured time-of-arrival for each individual blade was subtracted from a calculated time-of-arrival for each revolution. The calculated differences in the time-of-arrival, resulting from vibration of the blades, provided a vibration wave for each blade from which vibration frequencies could be extracted using a Fourier transform, see for example FIGS. 5 and 7.

In general, if $y_s$ blade or target sensors are located around the rotating blade row, the sampling frequency will equal the rotational frequency times the number of sensors, $y_s$, and the vibration of a blade is under-sampled for vibration frequencies higher than the fold-over frequency, $f_f$, where the fold-over frequency is defined by the Nyquist theorem as $f_f$=sampling frequency/2. That is, according to the Nyquist theorem, vibration frequencies that are greater than $f_f$ are folded back onto a 0 to $f_f$ (sampling frequency/2) frequency spectrum. By way of specific example, assume a single sensor vibration monitoring system detecting each blade or target once during each rotation of the rotor, and the rotor rotating at a speed of 3600 rpm, corresponding to 60 Hz, i.e., a sampling frequency of 60 Hz. This implies that vibration frequencies less than 30 Hz (60 Hz divided by 2) are unambiguously identified, as taught by the Nyquist Theorem. This 0 to 30 Hz frequency range (not including 30 Hz), is called the "first harmonic sampling range". The 30 Hz limit is called the "first sampling harmonic" which is also half the "first harmonic of running speed" (60 Hz) for the single sensor system. It is common practice to refer to this frequency range and the frequency limit using the same term "harmonic". Frequencies greater than the first sampling harmonic are folded down into the first sampling harmonic. Thus, for example, a 52 Hz excitation in the second sampling harmonic appears as a 30 Hz–(52 Hz–30 Hz)=8 Hz spectral line. The term "folded" is used to describe this apparent reflection about the first sampling harmonic. It should be noted that in most applications, a cut-off filter is used to remove all frequencies greater than $f_f$ so that it is certain that any excitations seen are uniquely identified with respect to frequency.

As another illustrative example of a limitation associated with prior art BVM systems, consider an excitation in the fourth sampling harmonic which must be folded three times, i.e., reflected about the third, and then the second, and then the first sampling harmonic. For example, a 109 Hz excitation in the fourth sampling harmonic is folded (reflected) about the third sampling harmonic (90 Hz) as follows:

90 Hz–(109 Hz–90 Hz)=71 Hz.

Then this 71 Hz frequency is folded (reflected) about the second sampling harmonic (60 Hz) as follows:

60 Hz–(71 Hz–60 Hz)=49 Hz.

Finally, this 49 Hz frequency is folded (reflected) about the first sampling harmonic (30 Hz) as follows:

30 Hz–(49 Hz–30 Hz)=11 Hz.

Accordingly, due to under-sampling, the excitation occurring at a frequency of 109 Hz in the fourth sampling harmonic will appear as an 11 Hz spectral line.

The resolution of the frequency measurement is determined by the length (time in integral number of revolutions of the shaft) of the data array. If one data point is recorded for a component during each revolution of the rotor and n revolutions of vibration data are analyzed by the Fourier transform, the first harmonic sampling range, i.e., 0 to 30 Hz, is divided into an integer multiple of the rotor rotations comprising i subharmonics or frequency bins, where i=n/2. For example, in the above described example of a prior art BVM system, assuming 32 revolutions of vibration data for each blade is analyzed by the Fourier transform for a single sensor system, i.e., one data point for each blade per revolution, the first harmonic sampling range is divided into 32×(½) or 16 frequency bins. In the 3,600 rpm example, the $i^{th}$ subharmonic or frequency bin is represented by $i_n$×(the first harmonic/i), or $i_n$×30/16=$i_n$×1.875 Hz, for each frequency bin corresponding to a number of revolutions, n, of the rotor.

In the prior art BVM analysis, knowledge of the blade mode frequencies was required to allow identification of the blade vibration excitations observed in the first harmonic sampling range. For instance, consider a mode in which the excitation vibration occurs at a frequency of 172 Hz. This blade excitation frequency is in the $6^{th}$ sampling harmonic; that is, it is greater than 150 Hz, but less than 180 Hz. Its position in the $6^{th}$ sampling harmonic is 172–150=22 Hz, which is nearest the 22/1.875=12 subharmonic. Folding the frequency down and reflecting about each harmonic, to the first sampling harmonic, results in a first sampling harmonic position of 8 Hz placing the real mode near the 4th subharmonic (8 Hz/1.875 Hz) in the first sampling harmonic range. Accordingly, the BVM analysis required additional information, such as would be provided by a strain gauge attached to the blades, to identify the actual frequency of the blades. However, in a running machine the strain gauges often fail quickly. Alternatively, the additional information could be determined through mathematical modeling.

The blade shroud vibration monitor (BSVM) system 44 of the present invention provides a method of analyzing data collected from the blade shroud 40 that, after rotor spin-up, may be characterized as responding to excitation forces as a single consolidated component. That is, while in the above described BVM analysis each individual blade 12 is analyzed as an independent component, separate from other blades 12 in the row, the present BSVM analysis may take the same basic data collected from the BVM system and perform an analysis without sorting with respect to blade or identifying a correspondence between the data and the particular individual blades 12.

The BSVM analysis includes collecting data or sensor output signals 48 from a plurality of circumferentially located points or targets 50 positioned around the shroud 40, where the sampling frequency, $f_s$, may be described as follows:

$$f_s = f_r \times y_s \times y_t \quad \text{(Eq. 1)}$$

where:
$f_r$=the rotational frequency of the rotor;
$y_s$=the number of sensors; and
$y_t$=the number sensor targets.

The number of targets 50 may, but need not necessarily, correspond to the number of blades 12 on a blade row. For example, on a blade row including fifty-eight (58) blades 12 and having a target 50 located on each of the associated shroud portions 32, the BSVM system 44 will acquire 58 data points for each sensor each revolution of the rotor 13. Using the above-described example in which data is collected for 32 revolutions of the rotor 13, and one sensor is used. The present system will have a data array of 32×58=1856 data points. In addition, the fold-over frequency will be greatly increased to (60 Hz/2)×58=1740 Hz, in contrast to the relatively low fold-over frequency of 30 Hz for the BVM system. As a result of the high fold-over frequency, there is little probability of folding of the vibration mode responses for low-pressure steam turbine and last stage combustion turbine blades, such that the identification of the vibration mode responses is substantially improved. It should be noted that other, smaller blades in the turbine are not typically shrouded. If they were, the mode frequencies would be higher than those described herein, in which case two or three sensors could be used to increase the fold-over frequency by a corresponding factor of two and three.

Further, in contrast to the BVM system in which a 16 subharmonic spectra is produced for each blade, the BSVM system provides a single 928 (i.e., 32×58/2) spectra for the shroud 40. The displacements of the targets 50 are provided as a function of time relative to the periodic rotation of the shroud 40 for time intervals that are integer multiples of rotor rotation. This is necessary for eliminating spectral leakage of the synchronous BSVM subharmonics (n×32, n=1, 2, 3, 4, . . . 29; i.e., for 58 targets) into the remaining nonsynchronous BSVM subharmonics. It is assumed that the synchronous BSVM subharmonics only reflect structural target placement errors, and are therefore ignored in the present analysis.

Accordingly, while there is a high probability that noise in the BVM system will fall within the same spectral line as a signal of interest, the BSVM system provides so many spectral lines that noise and other spurious signals typically will fall within their own spectral lines and signals of interest will fall within their own separate spectral lines. That is, the noise in the BSVM system is generally random and spread out over all 928 subharmonics. This same noise is spread out over 16 subharmonics in the BVM system. Thus, the BSVM system reduces the background noise at any one BSVM subharmonic by a factor of 928/16=58, as compared to that of the BVM system. In addition, for non-random noise, i.e., interference signals, there is a factor of 58 less chance that this interference will fold down onto the BSVM subharmonic of interest, as compare to that of the BVM system.

In addition to the natural frequency associated with any point, or target, on the consolidated shroud structure 40, there is also typically a shroud vibration mode nodal diameter that represents a phase of this fundamental frequency traveling around the shroud 40. Knowledge of the nodal diameter provides an indication of relative movement between target locations on the shroud 40, indicating additional stress in the blade row. The BSVM system provides a measure of the shroud vibration frequency, $f_v$, comprising the fundamental frequency, $f_f$, of the shroud structure 40 up-shifted or down-shifted by the shroud vibration mode nodal diameter, where the BSVM response is up-shifted if the nodal diameter phase is moving against rotation, and the BSVM response is down-shifted if the nodal diameter phase is moving with rotation, as is expressed by the following:

$$f_v = f_f \pm (f_r \times ND) \quad \text{(Eq. 2)}$$

where:
$f_f$=the fundamental frequency of the shroud structure;
$f_r$=the rotational frequency of the rotor; and
ND=the shroud nodal diameter.

It should be noted that the shroud nodal diameter also shifts the fundamental frequency slightly, since each nodal diameter tends to make the structure more rigid. Each nodal diameter typically shifts the fundamental frequency by 1 to 2 Hz.

The nodal diameter describes a shift in phase that occurs between the shroud targets 50 as the shroud 40 vibrates, such that a number of integral target-to-target phase shifts occur over 360 degrees around the shroud 40. Each integral nodal diameter shifts the BSVM response frequency 32 subharmonics, or 60 Hz, up or down from the fundamental shroud frequency. For example, if the nodal diameter is 7, then there will be a target-to-target shift in frequency of 7×60 Hz, with a net shift in phase around the shroud of 7×360 degrees. Thus, in the present example of a nodal diameter of 7, the BSVM will report the shroud vibration at the fundamental shroud frequency plus or minus 420 Hz (i.e., ±60 Hz×7), where it should be recalled that the fundamental frequency is also shifted up approximately 2×7 Hz=14 Hz. It may be noted that in the presently described embodiment, the shroud vibration frequency is provided without separately identifying the fundamental shroud frequency and nodal diameter components of the shroud vibration.

Figure 3:
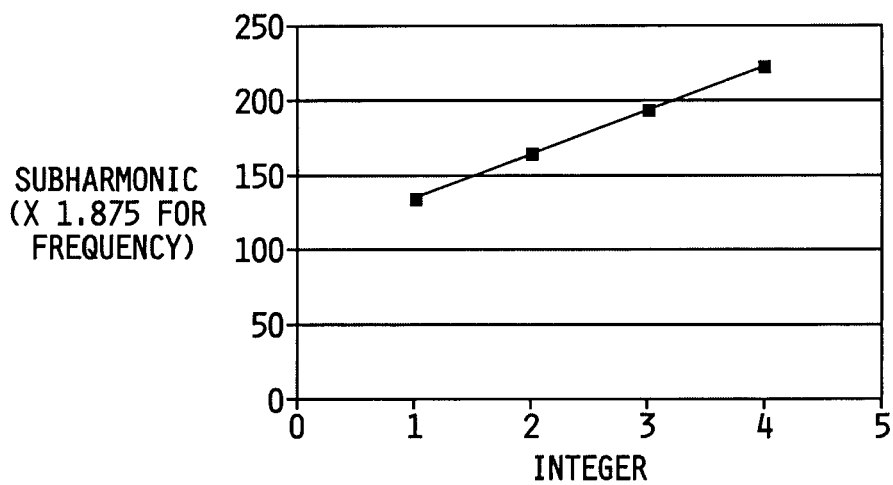
FIG. 3 is a graphical plot of the relationship between subharmonics and nodal diameters.

FIG. 3 illustrates that the subharmonics associated with nodal diameters are generally linearly related, separated by integer multiples of rotor rotation, where the nodal diameters are excited at different times depending on the nature of the aero elastic excitation that is generated by specific turbine operating conditions. In the case shown in FIG. 3, the subharmonics, as plotted on the vertical axis, have a separation that is substantially equal to ND×32, for a 32 revolution sampling, and the frequency may be determined by multiplying the subharmonic value by 1.875 Hz, for a 60 Hz rotational frequency.

Example 1

Figure 4:
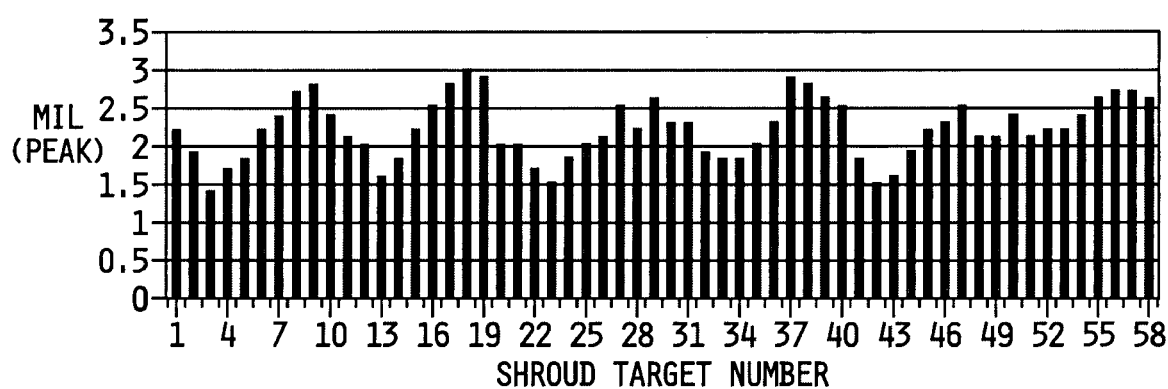
FIG. 4 is a graphical plot of a first example of an event resulting in vibratory displacements of shroud targets.
Figure 5:
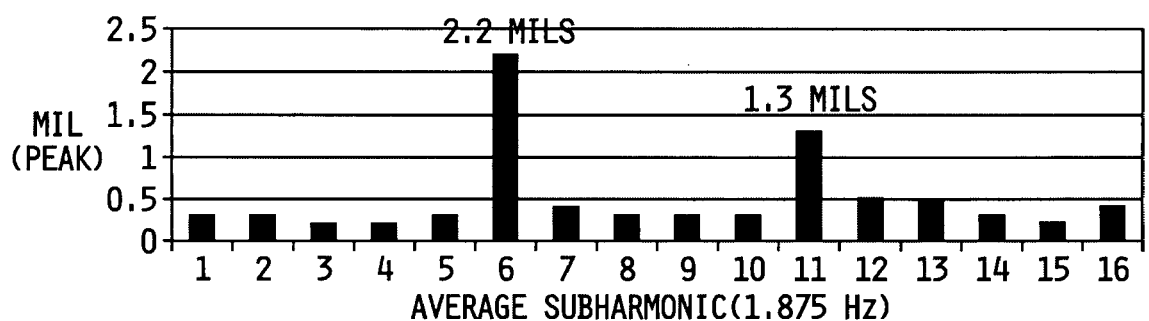
FIG. 5 is a graphical plot of an analysis performed by a blade vibration monitor on the target displacements of the event of FIG. 4.
Figure 6:
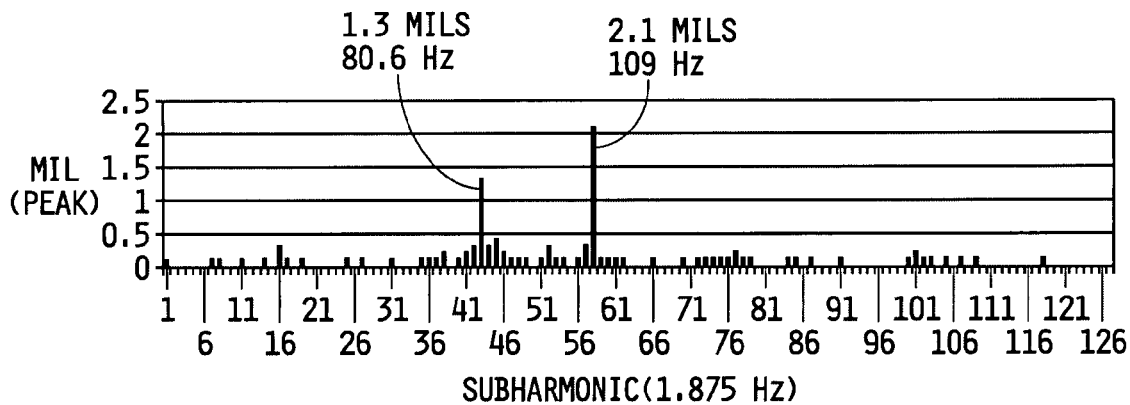
FIG. 6 is a graphical plot of an analysis performed by a blade shroud vibration monitor on the target displacements of the event of FIG. 4, where only the first 126 subharmonics of 928 generated subharmonics are shown.

Referring to FIGS. 4-6, a first comparison of an analysis provided by the BSVM system is shown relative to an analysis of the same data provided by the BVM system for a first event. The data is based on a test performed on a shrouded steam turbine blade row. Steel targets 50 were wedged into the outer surface of fifty-eight titanium shroud portions 32 corresponding to fifty-eight equally spaced blades 12, and a single magnetic reluctance probe was used to provide signals corresponding to the actual arrival time of the targets 50. The blade row was rotated at a speed of 3600 rpm, corresponding to a rotational frequency of 60 Hz.

FIG. 4 shows the BVM measured amplitude for each of the 58 targets (blades) based on the measured $6^{th}$ BVM subharmonic. FIG. 5 shows a 16 line BVM spectra (average of all blades) with 1.875 Hz resolution for the first event, in which the $6^{th}$ and $11^{th}$ subharmonics appear responsive, i.e., indicate a peak shroud vibration wave. The spectra for the BVM system folds at 30 Hz, meaning that all excitation frequencies greater than 30 Hz are folded onto the 0 to 30 Hz spectral range.

FIG. 6 shows a portion of a 928 BSVM spectra (only 128 spectral lines shown) with 1.875 Hz resolution for the same event. It can be seen that the $43^{rd}$ and $58^{th}$ subharmonics of the BSVM system are responsive, which correspond the $11^{th}$ and the $6^{th}$ subharmonics, respectively, of the BVM spectra, indicating that the actual frequency response may be obtained directly form the BSVM system, whereas a corresponding output of the BVM system provided an under-sampled response. It should be noted that in the BSVM system, a cut-off filter cannot be used to remove all frequencies less than the fold-over frequency, such that is not possible to verify that an observed signal has not been folded down. However, due to the relatively high fold-over frequency in the examples presented herein, it is generally assumed that the observed signals are generated within the first sampling harmonic.

Example 2

Figure 7:
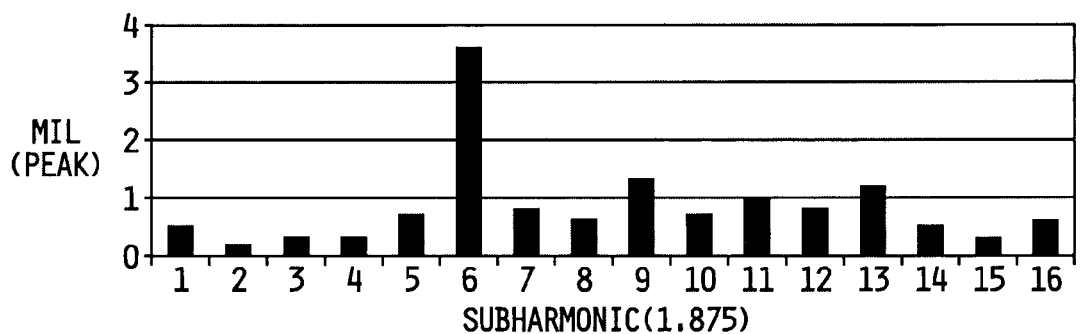
FIG. 7 is a graphical plot of an analysis performed by a blade vibration monitor on the target displacements occurring in response to a second example of an event.
Figure 8:
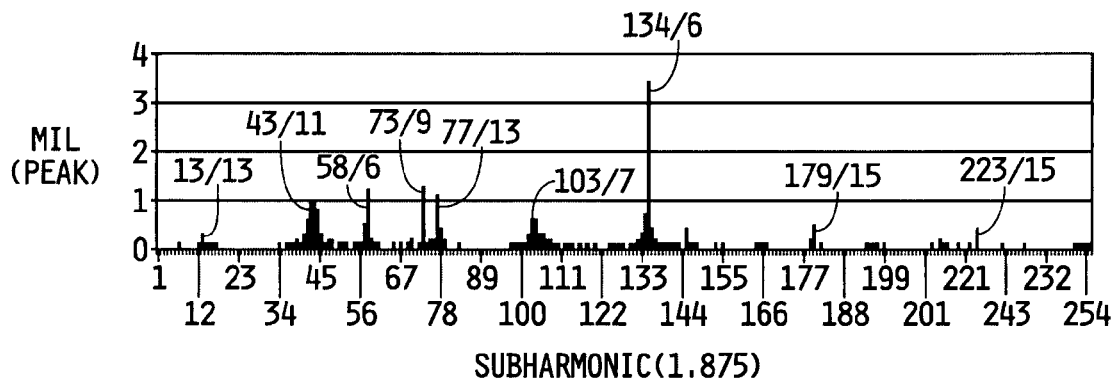
FIG. 8 is a graphical plot of an analysis performed by a blade shroud vibration monitor on the target displacements occurring in response to the second event, where only 254 subharmonics of 928 generated subharmonics are shown.

Referring to FIGS. 7-8, a comparison of an analysis provided by the BSVM system is shown relative to an analysis of the same data provided by the BVM system for a second event, using the same setup as described for Example 1.

FIG. 7 shows a 16 line BVM spectra with 1.875 Hz resolution for the second event, in which the $6^{th}$ subharmonic is shown as clearly appearing responsive. However, in the BSVM analysis of the same data, as shown in FIG. 8, it can be seen that both the $58^{th}$ and $134^{th}$ subharmonics are responsive which, in the BVM analysis, fold onto the 0 to 30 Hz spectral range, and which combine as a vector sum to appear as the $6^{th}$ subharmonic. In addition, the BSVM analysis illustrated in FIG. 8 shows further spectral lines at subharmonics of 43 Hz, 73 Hz, 77 Hz, 103 Hz, 179 Hz, and 223 Hz, as noted along with the corresponding folded down BVM subharmonics that result from an analysis of the blade vibrations taken individually.

From the above description, it can be seen that the analysis of the consolidated shroud structure 40 provided by the BSVM system 44 provides a fold-over frequency that is substantially higher than that provided in prior art analyses, such that substantially all of the vibration frequencies of interest may be found within the first sampling harmonic. Further, the increased number of spectral lines associated with the BSVM system 44 substantially improves the resolution of the results from the analysis of the consolidated shroud structure 40. An additional benefit of the present vibration analysis is the detection of recurring vibrational phases corresponding to nodal diameters, identified by frequencies that generally fall outside of a frequency range, i.e., first sampling harmonic range, that could be specifically determined in the prior art BVM system.

It should be understood that although the present BSVM system 44 has been described with reference to providing a number of targets 50 that correspond to the number of blades 12, a fewer or greater number of targets 50 may be provided, and that the results of the BSVM analysis are not dependent on a correspondence between the number of targets 50 and the number of blades 12. For example, a reduced number of targets 50, such as twenty-nine targets 50, may be positioned at predetermined locations around the circumference of the shroud 40 to provide satisfactory results. The targets 50 are preferably equally spaced around the shroud 40 and located at the same position on the shroud portions 32.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of monitoring a rotating coupled blade row with a vibration monitor, said rotating coupled blade row comprising a plurality of blades supported for rotation on a rotor and a shroud structure coupling said blades and defining an outer circumference of said blade row, and said vibration monitor comprising a stationary sensor positioned at said shroud structure and a plurality of sensor targets positioned at circumferentially spaced locations on said shroud structure with said sensor providing a time-dependent output signal responsive to the passage of each said sensor target, comprising the steps of:

determining, based on sensor output signals provided from said sensor, the actual arrival time of each said sensor target, and said vibration monitor storing a plurality of sensor output signals as a function of time relative to the periodic rotation of said shroud structure;

calculating for each of said sensor output signals a displacement between said actual arrival time and a predetermined expected arrival time for each sensor target to determine displacements of a plurality of different circumferential locations on said shroud structure as a function of time; and deriving a signal characteristic of a vibrational mode of said shroud structure based on said displacements of said circumferential locations on said shroud structure, wherein said signal characteristic of a vibrational mode comprises a recurring vibrational phase, wherein said recurring vibrational phase is a function of a fundamental shroud frequency and a shroud nodal diameter, and wherein said recurring vibrational phase comprises a shroud vibrational frequency, fv, equal to:

$$fv = ff \pm (fr \times ND)$$

where:
ff=the fundamental frequency of the shroud structure;
fr=the rotational frequency of the rotor; and
ND=the shroud nodal diameter.

2. The method of claim 1, wherein said step of deriving a signal characteristic of a vibrational mode of said shroud structure includes determining a peak shroud vibration wave during time intervals that are integer multiples of rotor rotation.

3. The method of claim 1, wherein the number of said sensor targets substantially corresponds to the number of said blades in said blade row.

4. The method of claim 1, wherein said step of deriving a signal characteristic of a vibrational mode of said shroud structure is performed based on a sampling frequency, fs, equal to:

$$fs = fr \times ys \times yt$$

where:
fr=the rotational frequency of the rotor;
ys=the number of sensors; and
yt=the number sensor targets.

5. The method of claim 4, wherein the number of sensor targets, yt, equals the number of said blades in said blade row.

6. The method of claim 1, wherein each of said blades have a shroud portion having opposing front and rear contact surfaces with respect to a rotational direction of said blade row, said shroud portions being arranged in such a way that shroud portions of two adjacent blades are brought into contact with each other at adjacent front and rear contact surfaces during rotor spin-up.

7. A method of predicting a blade structure failure within a blade structure comprising a plurality of blades supported for rotation on a rotor and a shroud structure coupling said blades, comprising the steps of:
determining displacements of a plurality of predetermined circumferential locations on said shroud structure during rotation of said blade row, where said displacements are provided as a function of time relative to the periodic rotation of said shroud structure for time intervals that are integer multiples of rotor rotation; and
deriving a signal characteristic of a vibrational mode of said shroud structure based on said displacements of said circumferential locations on said shroud structure,
wherein said shroud structure includes a plurality of sensor targets defining said predetermined circumferential locations on said shroud structure, and including at least one stationary sensor positioned at said shroud structure and providing a time-dependent output signal responsive to the passage of each said sensor target,
wherein said step of deriving a signal characteristic of a vibrational mode of said shroud structure is performed based on a sampling frequency, fs, equal to:

$$fs = fr \times ys \times yt$$

where:
fr=the rotational frequency of the blade row,
ys=the number of sensors; and
yt=the number sensor targets.

8. The method of claim 7, wherein the number of sensor targets, yt, equals the number of said blades on said blade row.

9. The method of claim 7, wherein the number of sensor targets, yt, is less than the number of said blades on said blade row.

10. The method of claim 7, wherein said signal characteristic of a vibrational mode comprises a recurring vibrational phase.

11. The method of claim 10, wherein said recurring vibrational phase is a function of a fundamental shroud frequency and a shroud nodal diameter.

12. The method of claim 11, wherein said recurring vibrational phase comprises a shroud vibrational frequency, fv, equal to:

$$fv = ff \pm (fr \times ND)$$

where:
ff=the fundamental frequency of the shroud structure;
fr=the rotational frequency of the rotor; and
ND=the shroud nodal diameter.

13. The method of claim 12, wherein said fundamental frequency, ff, comprises a fundamental frequency of said shroud structure shifted up by an amount approximately equal to 1 to 2 Hz multiplied by the nodal diameter.

14. The method of claim 7, wherein said step of deriving a signal characteristic of a vibrational mode of said shroud structure includes determining a peak shroud vibration wave occurring at time intervals that are integer multiples of rotor rotation.

15. The method of claim 7, wherein the number of said plurality of circumferential locations substantially corresponds to the number of said blades in said blade row.

* * * * *